United States Patent [19]
van Helsdingen et al.

[11] Patent Number: 4,847,773
[45] Date of Patent: Jul. 11, 1989

[54] SYSTEM FOR NAVIGATING A FREE RANGING VEHICLE

[75] Inventors: Carel C. van Helsdingen, Naarden; Jan O. Ten Cate, Drogteropslagen; Paul H. F. Peteri; Frank van der Heyden, both of Rotterdam, all of Netherlands

[73] Assignee: Industrial Contractors Holland B.V., Utrecht, Netherlands

[21] Appl. No.: 831,510

[22] Filed: Feb. 21, 1986

[30] Foreign Application Priority Data

Feb. 25, 1985 [NL] Netherlands .......... 8500529

[51] Int. Cl.$^4$ .......... H04L 7/02
[52] U.S. Cl. .......... 364/443; 318/587; 364/447
[58] Field of Search .......... 364/443, 444, 447, 448, 364/449, 424.01; 342/452, 70–71; 901/1, 47; 318/587; 180/167, 169, 168

[56] References Cited
U.S. PATENT DOCUMENTS

| 3,461,454 | 8/1969 | Steckenrides | 342/452 |
| 3,612,206 | 10/1971 | Ohntrup | 180/168 |
| 3,755,817 | 8/1973 | Wipff et al. | 364/444 |
| 4,112,421 | 9/1978 | Freeny, Jr. | 342/465 X |
| 4,119,900 | 10/1978 | Kremnitz | 901/1 X |
| 4,494,200 | 1/1985 | Lam | 364/443 |
| 4,500,970 | 2/1985 | Daemmer | 364/444 |
| 4,530,056 | 7/1985 | MacKinnon et al. | 364/449 |
| 4,656,406 | 4/1987 | Houskamp | 180/167 X |
| 4,674,048 | 6/1987 | Okumura | 901/1 X |
| 4,710,708 | 12/1987 | Rorden et al. | 364/449 X |
| 4,716,530 | 12/1987 | Ogawa et al. | 318/587 X |

Primary Examiner—Thomas H. Tarcza
Assistant Examiner—Tod Swann
Attorney, Agent, or Firm—Watson, Cole, Grindle & Watson

[57] ABSTRACT

System for navigating a free ranging vehicle on a surface comprising means for detecting the position of the vehicle on the surface and to determine and/or correct the path to be followed, the surface carrying a grid of passive marker elements and the vehicle being provided with detectors for detecting same.

11 Claims, 7 Drawing Sheets

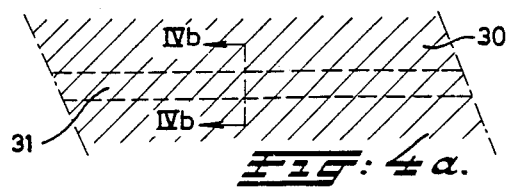
FIG: 4a.
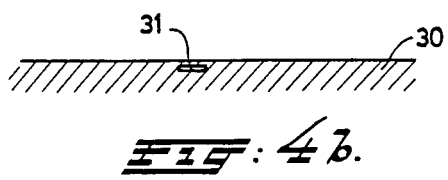
FIG: 4b.
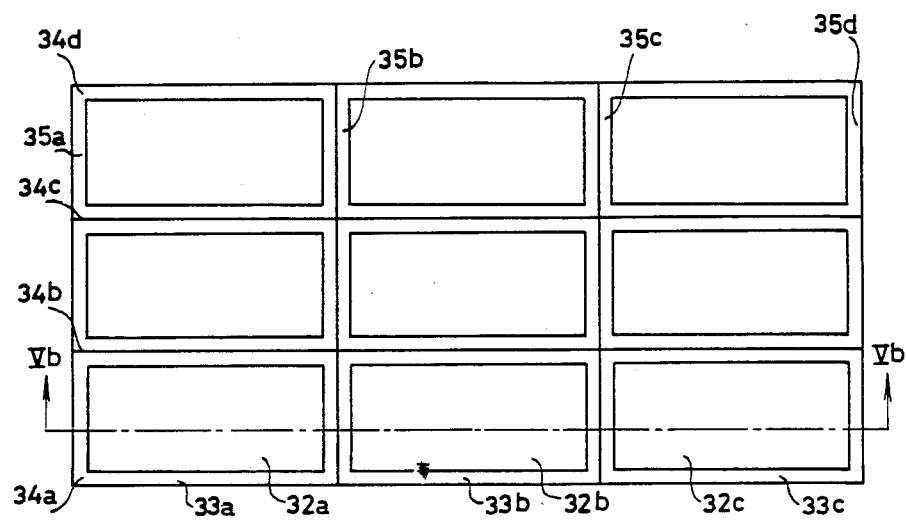
FIG: 5a.
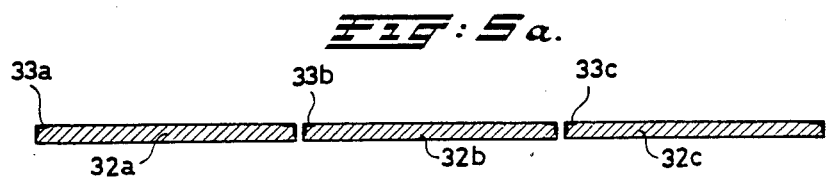
FIG: 5b.

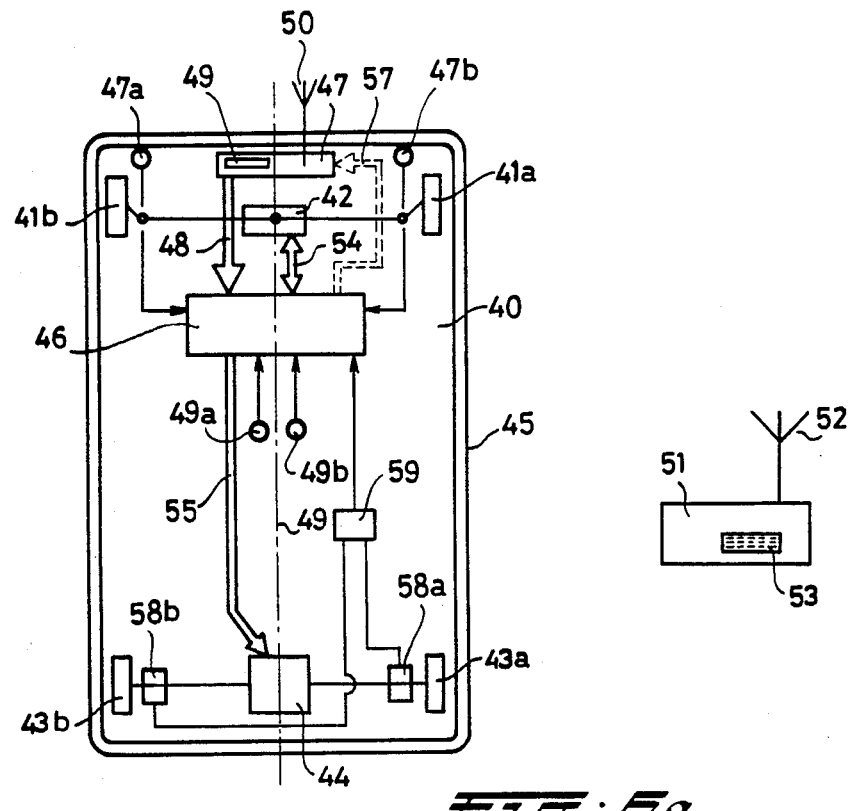
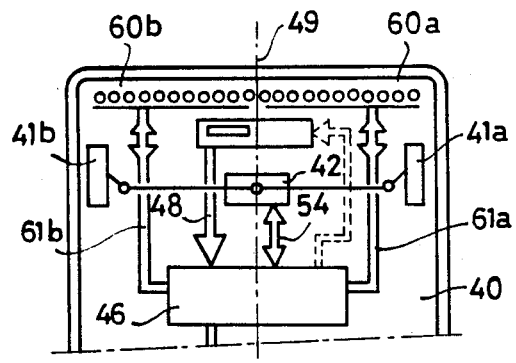
FIG: 6a.
FIG: 6b.

SYSTEM FOR NAVIGATING A FREE RANGING VEHICLE

BACKGROUND OF THE INVENTION

1. Field of the Invention

The invention relates to a system for navigating a free ranging vehicle which is provided with steering and control means, the system comprising means for detecting the position of the vehicle on the surface on which the vehicle moves and means for determining and/or correcting the path to be followed by the vehicle between an arbitrary starting point and an arbitrary destination.

2. The Prior Art

The problems relating to navigation of a free ranging vehicle are described in the article, "Free Range AGV Uses Laser Guidance", published in FMS Magazine, July 1983. However, the solution given in this article, i.e., the use of a number of coded beacons which are scanned by a laser beam is not without problems: the processing of the various signals is very complicated, an acceptable accuracy is difficult to obtain, and it is clear that this system can only be used on surfaces on which there are no high obstructions.

British Patent Specification No. 1,150,029 describes a system for guiding a vehicle provided with its own driving motor, based upon the use of an active network of electrical conductors carrying an alternating current, the vehicle following the path of the wires by sensing the electromagnetic field around the conductor. The vehicle to be guided starts by following a certain conductor and counts the number of transverse conductors which has been passed by it; after a predetermined number of these conductors have been passed, a left- or right hand turn can be initiated, and so on.

The number of starting points and destinations and the path to be followed are thus limited; the necessity to bury the insulated conductors (which necessarily may not be interrupted) in the ground, makes this known system in face only suitable for agricultural applications, such as described in the noted patent speicification, where the above-mentioned disadvantages can be tolerated.

The present invention aims to provide a navigation system by means of which a vehicle can be navigated with an accuracy which is sufficient for practical purposes, which does not require extensive modifications of the surface on which the vehicles runs and which is in its operation so flexible that practically any surface can be adapted to be used with the system according to the invention, and with which navigation can be effected between any arbitrary starting point and destination. In this connection it should be noted that the term navigation is meant the process of determining a suitable path for travel between a known starting position and an arbitrary destination, and the process of verification and correction of the path that is actually followed towards the planned path.

SUMMARY OF THE INVENTION

According to the invention this aim is achieved by providing a grid of passive marker elements and the surface on which the vehicle travels and by providing detectors on the vehicle for detecting the passive marker elements. According to the present invention, the term passive marker element is meant to include elements which can passively reflect radiation emanating from a detector or which can emit information when activated by radiation emanating from a detector, and excludes marker elements which must be powered.

By using a grid on, or embedded in, the floor, the measurement problem normally associated with free-ranging and navigation of driverless vehicles is largely eliminated.

The small distance between detector(s) and objects (marker elements) eliminates the measurement problems encountered with the known navigating system.

Navigation on a grid consists of
(1) computing a path over the grid so that the vehicle known when to expect to travel over which particular grid element, and of
(2) interpreting the detection of grid elements during route-execution so that the path is effectively followed and can be adjusted towards the planned path.

In other words, the vehicle will always know what to expect. As a result, markers that are identified with an explicit code, as for example radio beacons, are not necessary. This fact greatly simplifies the physical form of the grid that is to be installed on the floor.

The progress along the pre-computed path (computed directly after receiving a destination) is frequently checked when passing over markers and, if necessary, the actual path is adjusted. Between markers the vehicle cannot "measure" its position, but the measurement of travelled distance allows a sufficiently accurate prediction of the actual position at any time. Measured quantities can be the displacement of a marker relative to the longitudinal axis of the vehicle or angles at which line-shaped markers are crossed.

Of course such a system as described must have sufficient on-board computing power.

The big advantages of the system according to the invention lie in its great flexibility, the possibility of immediate adaptation to changing circumstances, the fact that passive marker elements are inexpensive, and particularly that the vehicles are completely independent of the surroundings in which they must move. The routing is flexible, and can be determined anew by the computer at the beginning of each part, while with the present state of the art suitable detectors are available.

In a preferred embodiment of the invention the marker elements consist of discrete elements, arranged according to an essentially regular pattern or grid, and particularly of transponders which are activated by irradiation with electromagnetic energy. Such transponders, as known, are commercially available and have the advantage that they can emit coded information in response to the irradiation and thus serve to facilitate the navigation.

The marker elements may also consist of magnetically-conducting material or permanent magnets, with the advantage that by means of a suitable orientation thereof additional information can be supplied to the vehicle. However, the discrete marker elements can also be of the type which can be sensed optically.

DESCRIPTION OF THE DRAWINGS

FIG. 4a is an upper view of a part of a line-shaped marker;

FIG. 4b is a section over the line IVa—IVa in FIG. 4a;

FIG. 5a is a top view of a part of a grid made from Stelcon ® plates;

FIG. 5b is a cross section over the line Vb—Vb in FIG. 5a;

FIG. 6a is a schematic top view of a vehicle provided with a number of detectors;

FIG. 6b is a schematic top view of part of a modified vehicle according to the invention to be used with discrete markers;

DESCRIPTION OF THE PREFERRED EMBODIMENTS

Figure 1:
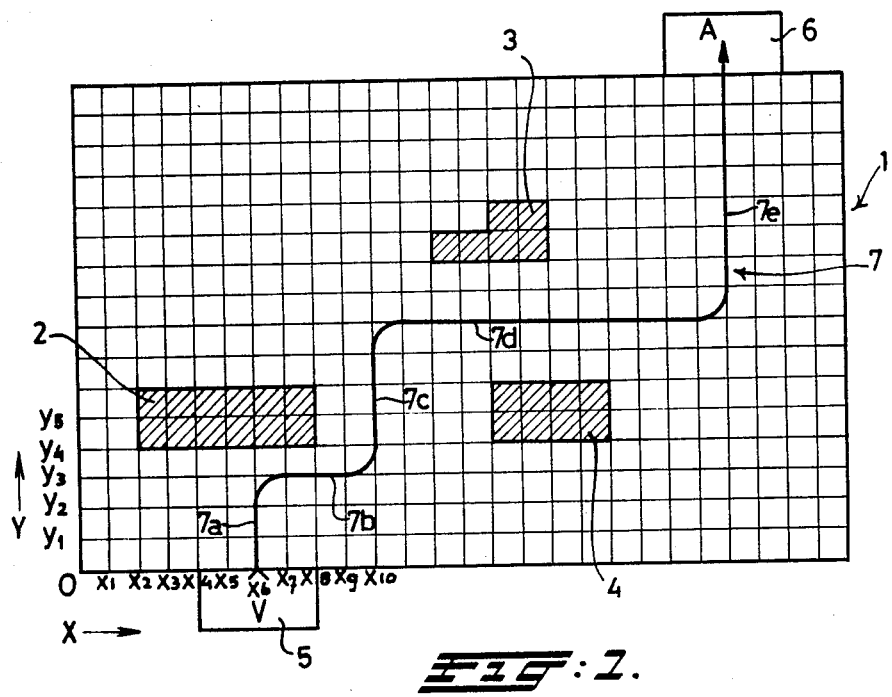
FIG. 1 is a schematic view of a surface provided with a grid of line-shaped markers and elucidates the navigation on such a grid.

FIG. 1 shows an example in which the vehicle, provided with a very simple navigating system, can range over a surface from a staring point to its destination, by following a path which consists of essentially straight parts which are interconnected by standard terms. This path is determined by line-shaped marker elements. FIG. 1 shows a surface, indicated generally with reference numeral 1, which is provided with a grid of line-shaped markers which are arranged according to an orthogonal coordinate system with origin 0; the marker lines are indicated with respectively x1, x2, . . . and y1, y2, . . .

Each square on the surface 1 is thus defined by an X- and Y-coordinate and the complete track of a vehicle over the surface 1 is in this simple example of navigating obtained by covering track parts in the X and Y direction, respectively. Other track parts at an angle with these directions are also possible, as will be described later on.

FIG. 1 shows a surface whose layout includes three hatched surface parts indicated with respectively 2, 3 and 4. These are surface parts which cannot be covered by a vehicle, for instance because they are used for storing materials. A vehicle which leaves from the point of departure 5 and has as its destination the point of arrival 6 could follow a route such as indicated with the line 7; this route comprises a succession of straight line elements, starting with a part 7a in the Y-direction, thereafter a part 7b in X-direction, followed by a part 7c in Y-direction, a part 7d in X-direction and once again a part 7e in the Y-direction. In which way the drive- and control mechanism of the vehicle will receive the various necessary commands will be explained later, but from the above it will be clear that the route as covered is in fact determined by continuously determining the position of the vehicle with respect to the marker elements of which the position is known and by counting the number of passed markers.

Figure 2:
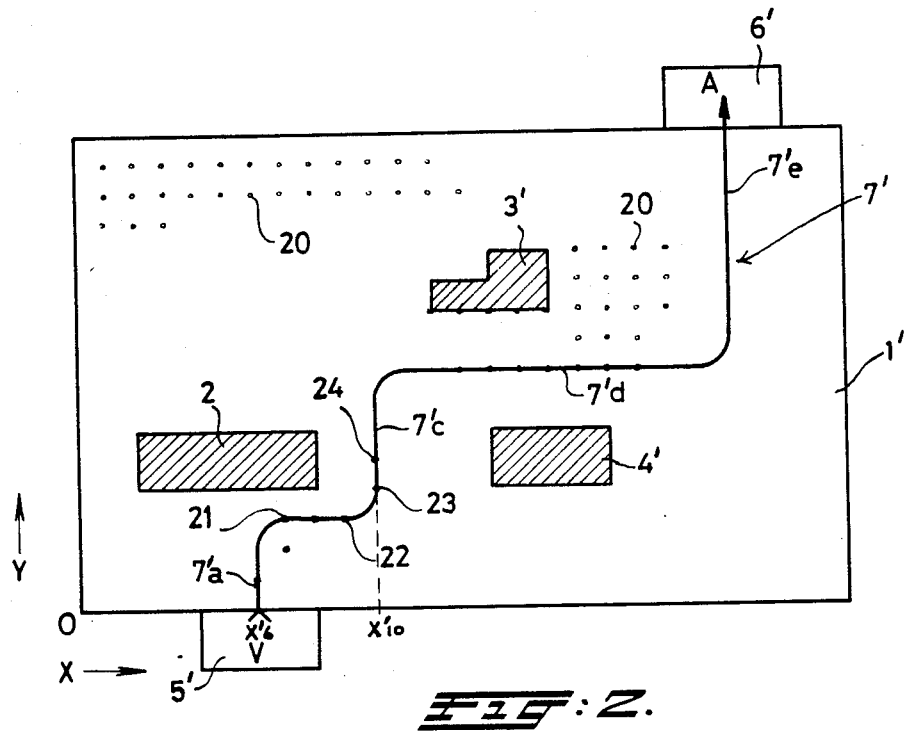
FIG. 2 is a top view of a surface provided with a grid of discrete markers and elucidates the navigation on such a grid.

FIG. 2 shows a surface which is in principle the same; corresponding parts are here indicated with the same reference numerals as used in FIG. 1 but provided with prime marks. In this embodiment the markers consist of discrete marker elements 20 provided on the crossing points of the X- and Y-lines of an orthogonal coordinate system. While a vehicle which is guided by means of line-shaped marker elements can use a relatively simple set of detectors, for example proximity switches, to follow these marker elements, a vehicle which is used in combination with the discrete marker elements according to FIG. 2 must be provided with a more elaborate control system which is able to follow, starting from a certain known starting point, a predetermined track to the next discrete marker element and which is capable of executive turns to the right and to the left with a standard radius. The counting-off of the marker elements is effected in principle in the same way as in the embodiment according to FIG. 1.

A vehicle which leaves at point x'6 must thus, after the passing of two markers, initiate a right hand turn which brings it above the marker 21 at the crossing point of - imaginary - coordinate line x'7 and y'3 and then go straight on; after passing the second next marker 22 a left hand turn must be initiated which brings it above the marker 23 at the crossing point of the - imaginary - line x'10 and y'4 whereafter it goes straight on to the marker 24, etc. A specific embodiment of such a discrete marker will be described later on.

Figure 3A:
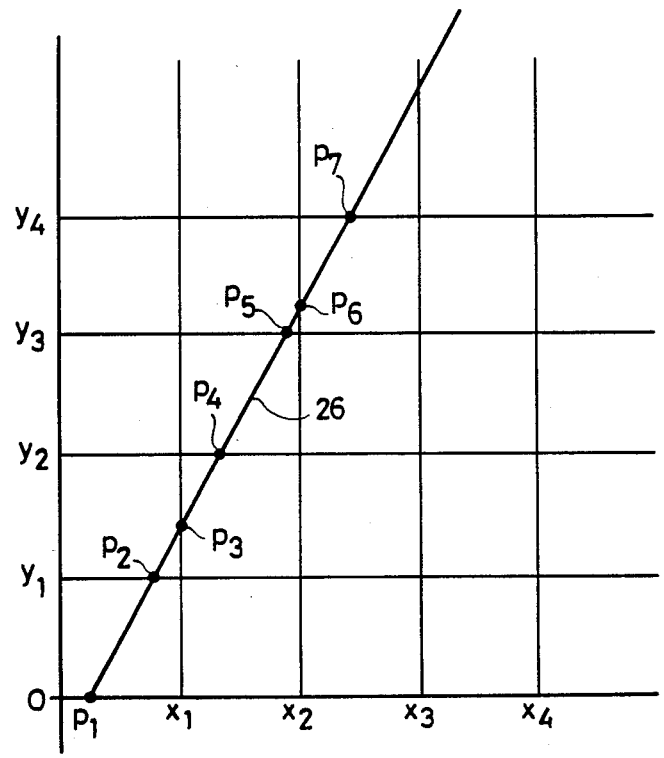
FIGS. 3a, 3b and 3c relate to the navigation on parts of a surface provided with line-shaped markers.

FIG. 3a elucidates the way in which navigation is possible over a grid of line-shaped marker elements when traversing an arbitrary route across the surface, from a first position to a second position.

Figure 3B:
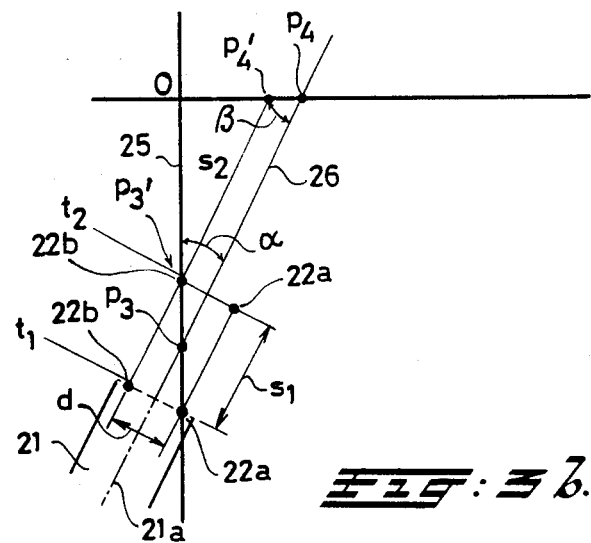

Firstly it must be pointed out that navigation according to this example presupposes that the route to be followed consists of moving from one known point to the next point and determining the position of this next point. In FIG. 3a it is presumed that the vehicle starts at P1, of which the position is known and must move to P2, from P2 to P3, from P3 to P4 and so on. FIG. 3b elucidates this and relates to the route part between P3 and P4.

At the moment t1 (see FIG. 3b) the right hand detector 22a of the schematically shown vehicle 21 passes the vertical line-shaped marker 25 (X1) and at moment t2 the left hand detector 22b passes this vertical marker 25. By using odometry, for instance by employing rotary encoders coupled to the rear wheels, combined with digital counters, the paths covered by the detectors 22a and 22b in the direction of the route 26 can be measured. As the distance d between the detcting elements 22a, 22b is known, the value of angle $\alpha$ is known from $tg\alpha = s/d$ and from $\alpha$ follows, as $$\beta = (90° - \alpha)., s_1$$

and d being known.

The exact position P4' at which detector 22b crosses the horizontal marker element can be computed when $s_2$ (distance between crossing point of vertical marker P3' and crossing point horizontal marker) is measured as $OP4' = s_2 \sin \alpha$.

In the same way, P5 (FIG. 3a) can be determined starting from the now known position P4. The fact that at each crossing point of a line-shaped marker the angle between the actual track and the marker is known, results, combined with information about the position of the preceding crossing point into information of the actual crossing point of the marker. It must be born in mind that the nominal positions of the points P1, P2, etc., are computed and stored in advance in the central computer of the vehicle. By comparing the position of the actual crossing points with the pre-computed data, steering corrections can be made when the vehicle deviates from its planned route.

Figure 3C:
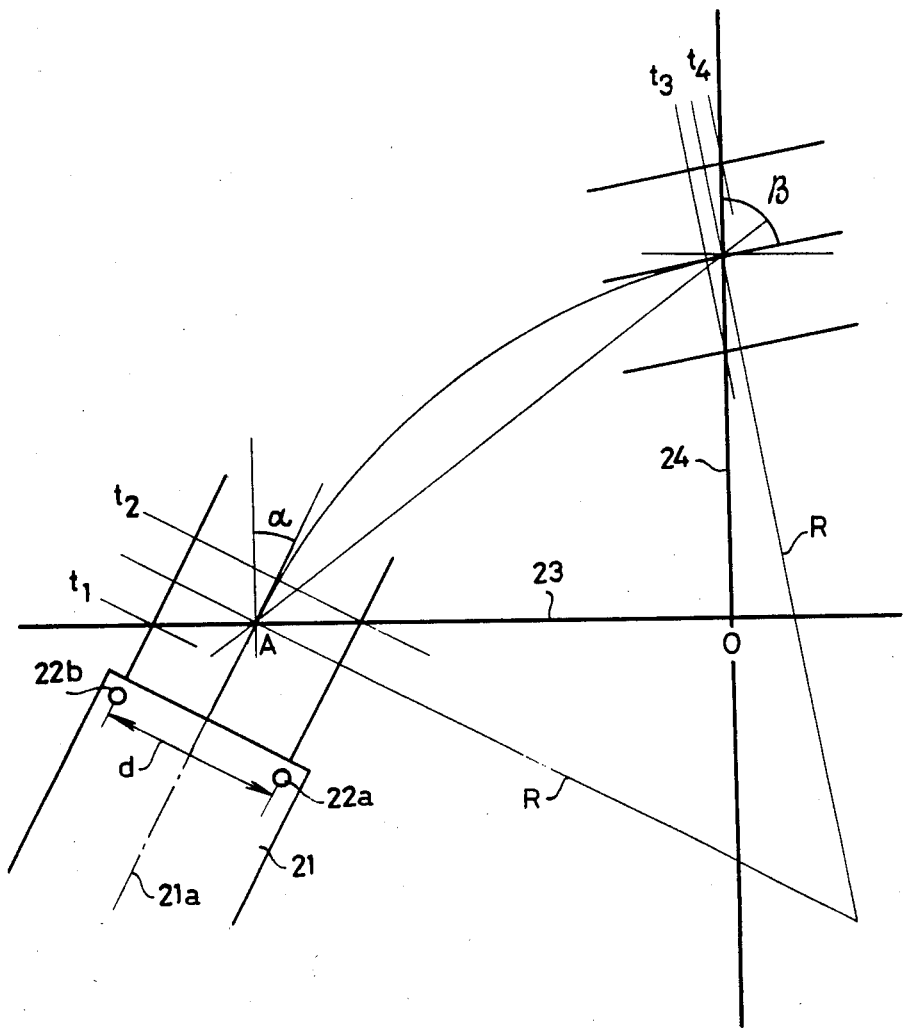

Of course it is advantageous when the vehicle is also capable of negotiating turns which interconnect one track part with another. FIG. 3c relates to this situation. In FIG. 3c is assumed that the vehicle makes a turn with a known radius R and travels with a constant speed v. Here, too, the vehicle 21 is provided with two detectors 22a, 22b at a distance d.

It follows from FIG. 3c that the detector 22b will be the first one to cross the horizontal line-shaped element 23 at the moment t1 and at this moment detector 22b emits a signal to a central control- and computing unit (to be described later). When a few moments later detector 22a crosses the horizontal marker element 23 at moment t2 it also emits a signal; upon reaching the vertical marker element 24 the right hand detector 22a will be the first on to emit a signal at moment t3 and therafter the left hand detector 22b will emit a signal at moment t4.

It can be shown that the following equations are valid:

$$tg\alpha = \frac{v}{d}(t2 - t1) \quad (1)$$

$$tg\beta = \frac{d}{v(t4 - t3)} \quad (2)$$

$$R(\beta - \alpha) = v(t3 - t2) \quad (3)$$

From these equations $\alpha$, $\beta$ and R can be determined. It then follows:

$$OA = R(\cos \alpha - \cos \beta) \quad (4)$$

$$OB = R(\sin \beta - \sin \alpha) \quad (5)$$

Thus by measuring the time only between the moments on which the detectors 22a and 22b cross the horizontal marker element 23 and the vertical marker element 24 respectively, the exact position of the vehicle with respect to these marker elements and the route which it has been following is known.

Another solution would be the use of odometry (measuring the distance travelled by two wheels of the vehicle, these wheels being at a known distance d) in combination with the measurement as described before of the angle at which the vehicle crosses a certain marker element; then the angle at which the next marker element is expected to be crossed can be computed.

The nominal crossing angle is known and on the basis of the difference between the actual crossing angle and the nominal crossing angle, the position error can be computed and the path of the vehicle corrected.

Of course, combining time measurement with odometry will result into an even more foolproof navigation.

Figure 3D:
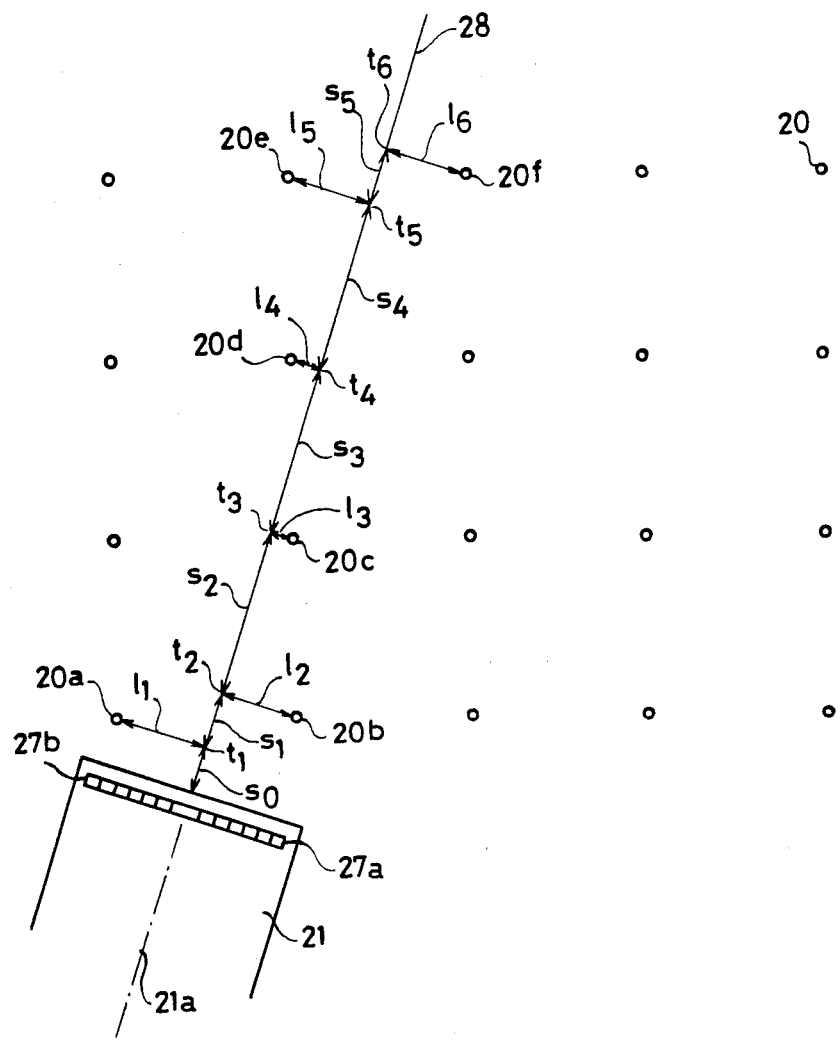
FIG. 3d elucidates another way of navigating, using a grid of discrete markers, if necessary combined with odometry.

FIG. 3d shows an example of navigating using a grid of discrete marker elements. The vehicle 21 with its longitudinal axis 21a is provided with two linear arrays of detectors 27a, 27b, respectively, to the right and to the left of the longitudinal axis 21a and perpendicular thereto. In FIG. 3d it is presumed that the path 28 to be followed is in line with the longitudinal axis 21a of the vehicle and that this path does not coincide with the coordinate system according to which the markers 20 are arranged.

At the moment t1 the left hand array 27b—after having travelled a known distance s0 from a known starting point—detects the marker 20a at a distance $l_1$ to the left of the axis 21a. Then follows the sequence: After distance s1 array 27a detects marker 20b at $l_2$ to the right—
After s2 array 27a detects marker 20c at $l_3$ to the right—
After s3 array 27b detects marker 20d at $l_4$ to the left—
After s4 array 27b detects marker 20e at $l_5$ to the right—
After s5 array 27b detects marker 20f at $l_6$ to the right—
and so on.

Thus when the respective detected lateral distances of the successive marker elements with respect to the longitudinal axis 21a correspond with the data as stored in the navigating computer of the vehicle, the vehicle "knows" that it is following the correct track; if not so corrections can be made. Note that detecting the travelled distances s0, s1, etc. is not really necessary but results as above into an advantageous redundancy.

Line-shaped markers are possible in various embodiments. They can, as known, consist of light-reflecting material and be painted in each desired configuration on the surface.

Scanning of such lines with optical sensors is known, but such markers have to drawback that they get dirty; preferably one will use markers which consist of magnetically-conducting material. They can be embedded in the floor such as shown in the FIGS. 4a and 4b. Reference numeral 30 indicates the floor; the line-shaped marker 31 is embedded a short distance under the surface.

Many advantages are obtained when the grid consists of the metal frames of the well-known concrete floor elements best known under the trademark "Stelcon" ®. FIGS. 5a and 5b show a number of such plates of which some are indicated with 32a–32c. Ech plate has, as known, a metal frame of which a number are indicated with 33a–33c and which, as shown, in combination constitute a perfect grid of mutually perpendicular lines 34a–34d and 35a–35d, respectively. such a grid of marker elements is eminently suitable for use in the system according to the invention.

FIG. 6a shows a vehicle with detectors and control means for navigating across a surface with line-shaped marker elements. The vehicle 40 comprises front wheels 41a, 41b, a steering unit 42, rear wheels 43a, 43b driven by the motor 44 and is surrounded by a safety fender 45. The central control unit 46 receives signals from detectors 47a, 47b placed at the front of the vehicle and responding to the presence of marker elements.

Detectors 49a, 49b at the respective sides of the longitudinal axis 49 can be used in a simple navigating system to follow a longitudinal marker element. The central control unit 46 receives commands from the program- and control unit 47 via the connection 48; the unit 47 can be provided wit a keyboard 49' to input layout data and information about the track to be followed, but such information can also be transmitted wirelessly by means of a receiver 50 and from a distant control unit 51 with an emitter 52 and keyboard 53.

The control unit 46 controls via the two-way connection 54, the steering device 42 and receives back steering angle information; the drive unit 44 is controlled via the connection 55.

Of course it is also possible that all information supplied by the sensors is fed back to the unit 47 as indicated schematically with the dot-lined connection 57, is then emitted to the central unit 51 and processed there. The unit 51 then returns the necessary steering commands to the vehicle. The above-mentioned control- and navigation system can be completed by a device to determine the distance covered (odometry) in the direction of the track, for using instance encoders 58a, 58b, coupled to the rear wheels of the vehicle and cooperating with a revolution counter 59 which feeds the information to the control unit 46.

FIG. 6b shows the front part of a vehicle to be used for navigating over a surface provided with a regular grid of discrete marker elements, such as the surface shown in FIG. 2, and in the way as described hereinbefore with reference to FIG. 3d. The vehicle 40 is provided at its front end with two linear arrays of detecting elements 60a, 60b. These arrays are scanned under the control of the central unit 64 and they feed back their information to this central unit as indicated schematically by the connections 61a and 61b. The other parts of the vehicle are not shown and they are the same as those shown in FIG. 6a. The detectors can be known proximity switches.

Figure 7:
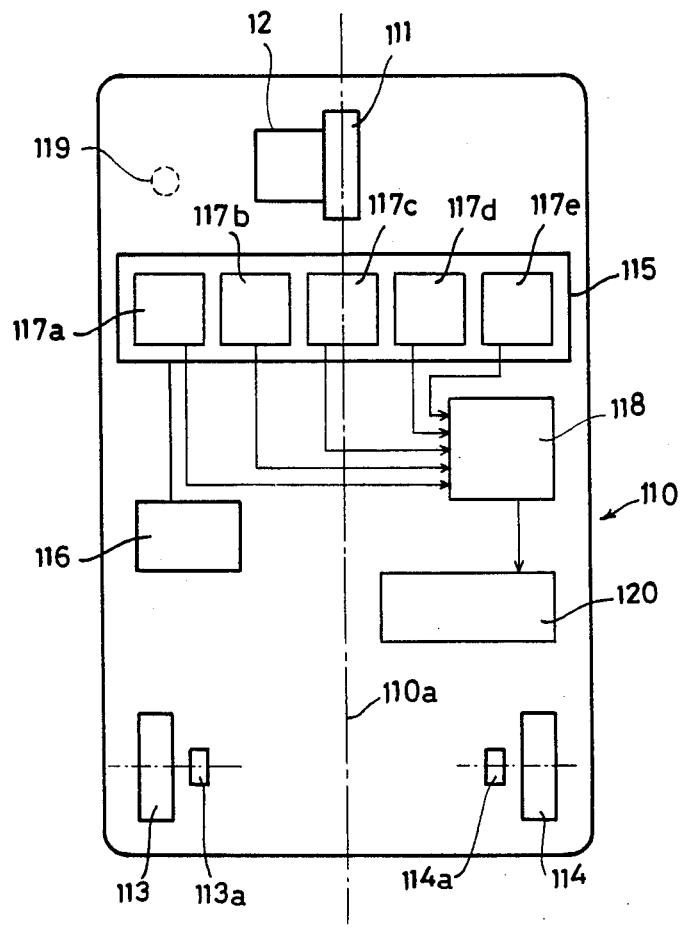
FIG. 7 shows the use of a discrete marker of the transponder-type in combination with a suitably equipped vehicle.

FIG. 7 relates to the use of marker elements of the so-called "transponder"-type. Such elements are marketed by the Dutch firm of Nedap, Groenlo, and have the shape of a small cylinder, about 8 cm long and with a diameter of about 4 cm. They have the property that when they are excited by irradiation with electromagnetic energy with a frequency of about 100 kHz, they respond by emitting a coded signal at the same frequency. This makes it possible to use them not only as marker elements, but also to transmit to the vehicle explicit information about its actual position on the grid which can be very useful.

According to FIG. 7 the schematically shown vehicle 110 has a front wheel 111 with its driving motor 112, rear wheels 113 and 114, each with an odometry encoder 113a and 114a respectively, an emitting loop 115, excited by the emitter 116 and, in this example, five receiver loops 117a ... 117e of which the outputs are connected to the circuit 118. This circuit 118 decodes the information present in the signals picked-up by the receiver loops 117a ... 117e, and emitted by a marker 119 which is in the vicinity of the vehicle 110 and close enough to the emitter loop 115 to be excited thereby. Another marker element, too far away to be detected in the shown position of the vehicle, is indicated with 119a.

Note that the position of the marker 119 with respect to the longitudinal axis 110a of the vehicle 110 can be derived from the relative strengths of the signals produced by the loops 117a ... 117d.

After the evaluation of the received signals, the decoder/level-detector 118 transmits the position information to the central computer 120.

Of course the discrete marker element can also consist of marker elements which can be scanned optically, for instance by having light reflecting surfaces or optically recognisable shapes. Examples of these elements are described in for instance, the German Patent Application No. 2.910.490, relating to a vehicle guidance system.

It is clear that within the framework of the invention many other embodiments are possible; a practical and working embodiment of the system according to the invention can be constructed by any expert using the present-day systems and components known to him. Particularly in connection with the logistics of free ranging unmanned vehicle systems one can make use of existing technology and this is also valid with regard to the detectors which are necessary to sense the marker elements and the circuits for processing the signals resulting from the sensing.

What is claimed is:

1. A combination of a vehicle and navigation system for controlling movement of the vehicle on a surface having a certain layout, said vehicle including wheels, a motor for driving the wheels and a steering means for the wheels, and said navigation system comprising:
   a plurality of passive marker elements which are positioned on or in said surface for providing a grid over which said vehicle can move,
   detector means on said vehicle for detecting said passive marker elements when said vehicle passes thereover so as to provide intermittent grid-detection signals,
   sensor means on said vehicle for determining the linear distance traveled by said vehicle over said surface,
   a computer control unit having a memory on said vehicle which is connected to said steering means, to said detector means, and to said sensor means, said computer control unit functioning to compute a planned path of said vehicle over said surface from any arbitrary starting point to an arbitrary destination considering said layout and, based on stored information in said memory regarding said layout and said grid, the intermittent grid-detection signals from said detector means, and information provided by said sensor means, to control said steering means so as to correct deviations of movement of said vehicle along said planned path, and
   input means connected to said computer control unit for inputting information regarding said arbitrary starting point, said arbitrary destination, said center layout, and said grid.

2. A combination according to claim 1, wherein said detector means detects distances to said passive marker elements.

3. A combination according to claim 1, wherein said grid consists of discrete elements arranged according to an essentially regular pattern.

4. A combination according to claim 3, wherein said discrete elements consist of magnetically-conducting material.

5. A combination according to claim 4, wherein said discrete elements consist of permanent magnets.

6. A combination according to claim 3, wherein said discrete elements are transponders which are activated by irradiation with electromagnetical energy.

7. A combination according to claim 1, wherein said passive marker elements are in the form of continuous lines arranged according to a coordinate system.

8. The system according to claim 7, wherein said passive marker elements consist of magnetically-conducting material.

9. A combination according to claim 7, wherein said surface comprises individual floor elements and passive marker elements consist of metal frames around said floor elements.

10. A vehicle which can be moved in a controlled fashion over a surface which has a certain layout and which is provided with a plurality of passive marker elements arranged to form a grid, said vehicle including wheels, a motor for driving the wheels, a steering means for the wheels, at least one detector for detecting said passive marker elements, a sensor means for determining the linear distance traveled by said vehicle over said surface, a computer control unit with memory which is connected to said steering means, to each said detector and to said sensor means, said computer control unit being capable of computing a planned path of said vehicle over said surface from any arbitrary starting point to an arbitrary destination, taking into consideration said layout and said grid, and controlling the movement of said vehicle over said surface, and input means for inputting information to said computer control unit regarding said arbitrary starting point, said arbitrary destination, said certain layout and said grid.

11. A method of navigating a vehicle over a surface from an arbitrary starting point to an arbitrary destination, said surface having a certain layout and including a plurality of passive marker elements which together provide a grid pattern over which the vehicle can move and said vehicle including a steering means, a detector means for detecting said passive marker elements when said vehicle passes thereover, a sensor means for determining the linear distance traveled by said vehicle over said surface, and a computer control unit with a memory, said computer control unit being connected to said detector means, said sensor means and said steering means and operating to control said steering means on said vehicle and thus the movement of said vehicle over said surface, said method including the steps of:
 (a) inputting into said computer control unit data regarding said layout of said surface, said grid, said arbitrary starting point and said arbitrary destination,
 (b) computing in said computer control unit information regarding a planned path for said vehicle to follow in moving from said arbitrary starting point to said arbitrary destination and storing said planned path information in said memory,
 (c) computing in said computer control unit the positions relative to the planned path of the particular passive marker elements of said plurality of passive marker elements that are to be expected to be detected by the detector means on said vehicle when said vehicle follows said planned path,
 (d) moving said vehicle over said surface such that said detector means provides signals representing actual passive marker position information,
 (e) comparing in said computer control unit the actual passive marker position information provided by said detector means in step (d) to said computed passive marker positions from step (c) to determine a difference between the actual vehicle position on said surface and the planned vehicle position along said planned path,
 (f) sending steering signals from said computer control unit to said steering means to change the direction of movement of said vehicle when necessary so as to move said vehicle towards said planned path, and
 (g) repeating steps (e) and (f) whenever passive marker elements are detecter by said detector means until said arbitrary destination is reached.

* * * * *